Dec. 16, 1941.  F. J. WILLIAMS  2,266,485
BALANCED THROTTLING VALVE
Filed Feb. 7, 1940  3 Sheets-Sheet 1
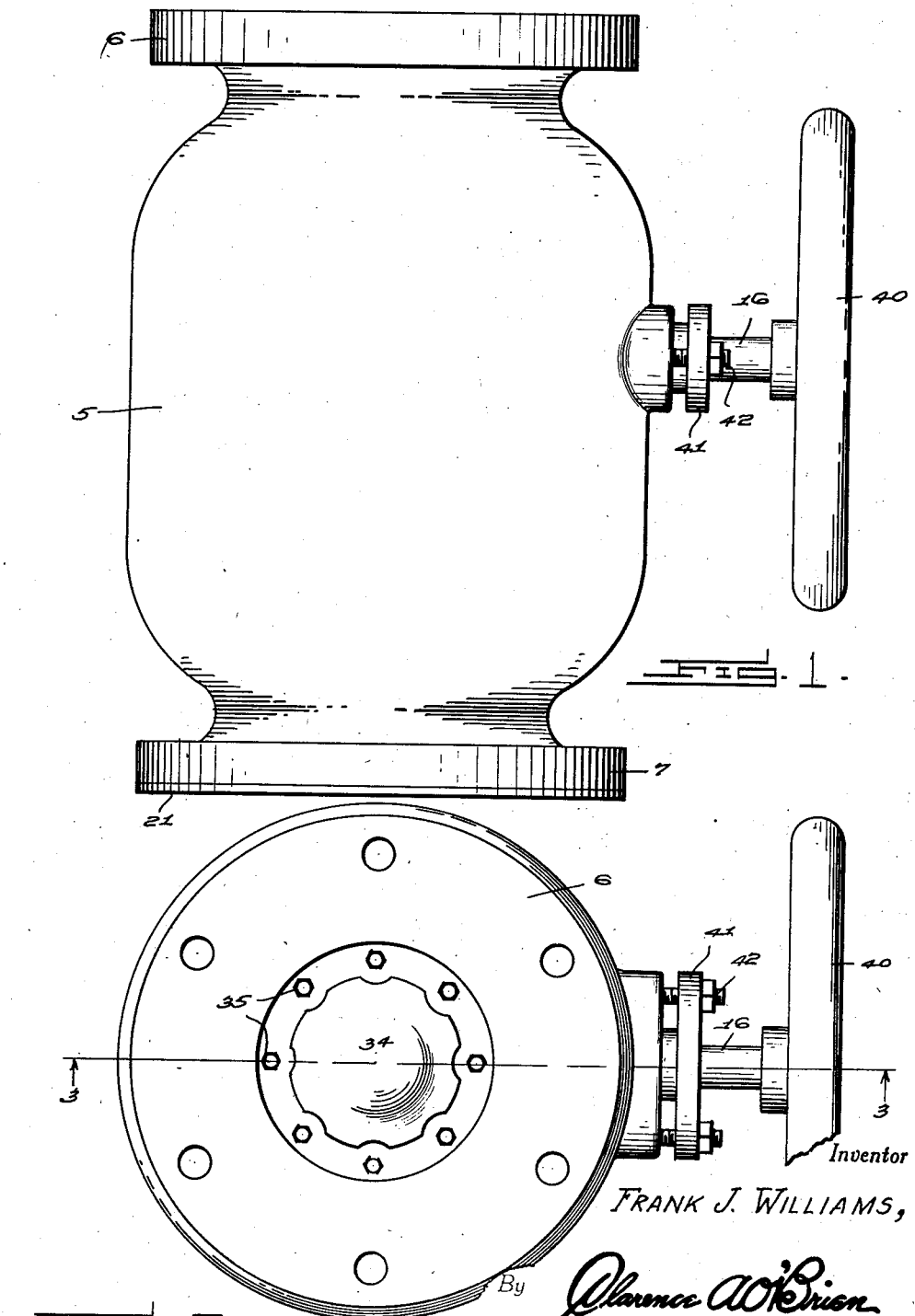
Inventor
FRANK J. WILLIAMS,
By Clarence A. O'Brien
and Hyman Berman
Attorneys

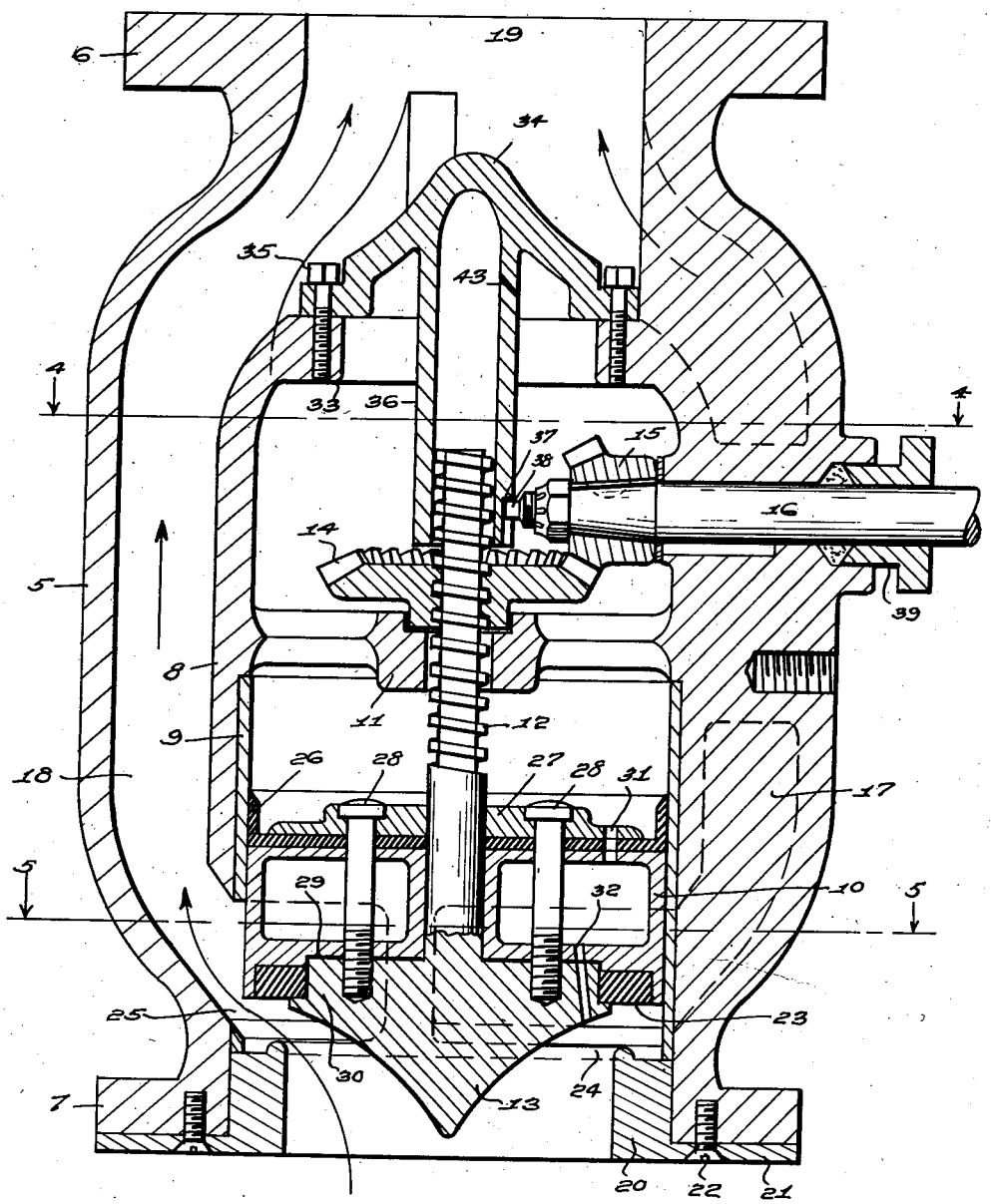

Dec. 16, 1941.                F. J. WILLIAMS                2,266,485
                         BALANCED THROTTLING VALVE
                          Filed Feb. 7, 1940          3 Sheets-Sheet 3
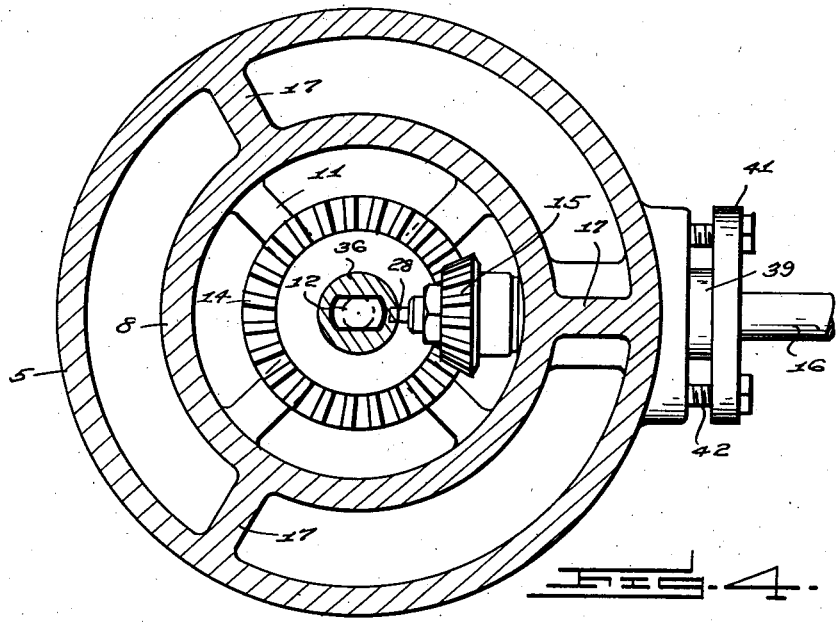
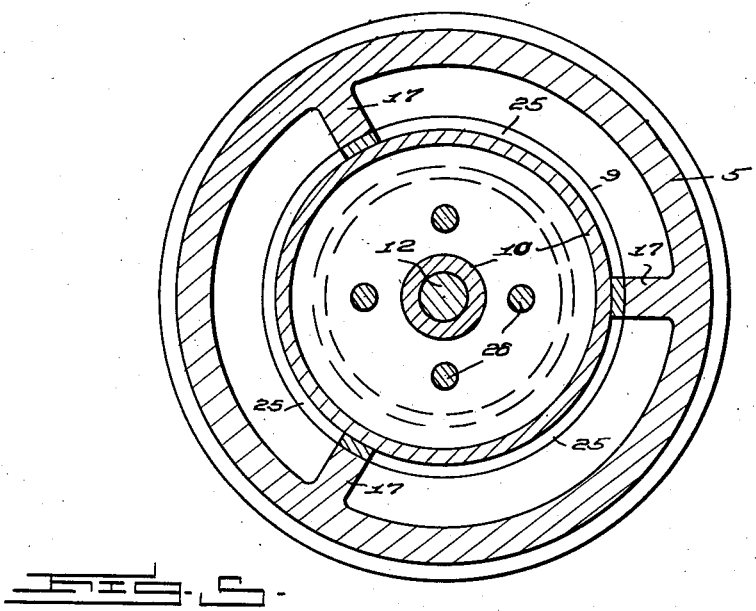
Inventor
FRANK J. WILLIAMS,
By Clarence A. O'Brien
and Hyman Berman
Attorneys Patented Dec. 16, 1941

2,266,485

UNITED STATES PATENT OFFICE 2,266,485

BALANCED THROTTLING VALVE

Frank J. Williams, San Fernando, Calif.

Application February 7, 1940, Serial No. 317,745

1 Claim. (Cl. 137—139)

This invention appertains to new and useful improvements in the general art of valves and more particularly to a balanced throttling valve, the principal object of the invention being to provide a valve for controlling and regulating the flow of water or other liquid in a pipe line without loss of head or velocity.

Another important object of the invention is to provide a valve constructed in such a manner as to permit easy operation under any pressure.

Other objects and advantages of the invention will become apparent to the reader of the following description.

In the drawings—

Figure 1 represents a side elevational view of the valve.

Figure 2 is an end elevational view of the valve.

Figure 3 is a sectional view taken substantially on the line 3—3 of Figure 2.

Figure 4 is a transverse sectional view taken substantially on the line 4—4 of Figure 3.

Figure 5 is a transverse sectional view taken substantially on the line 5—5 of Figure 3.

Referring to the drawings wherein like numerals designate like parts, it can be seen that numeral 5 represents the shell of the valve having pipe line attaching flanges 6 and 7 at the ends thereof.

Inside of the shell 5 is the cylinder 8, one end portion of which is bored to accommodate the liner 9 in which operates the piston 10. A spider 11 is provided at the inside of the intermediate portion of the cylinder 8 and has a smooth bore therethrough, through which the screw shaft extension 12 of the tapered valve head 13 is movable. Meshing the threads of the shaft 12 is the internally threaded beveled gear 14 which, in turn, meshes with the beveled pinion 15. The pinion 15 is keyed to the shaft 16 which is journaled through the shell 5 and through one of the webs 17 which spaces to the cylinder 8 from the shell 5 and defines the fluid passageways 18 from one neck 19 to the other in which the annular valve seat 20 is located.

The valve seat 20 snugly fits inside of the corresponding neck of the shell 5 and has a laterally disposed flange 21 which is secured to the adjacent flange 7 by machine screws 22. The inner edge of the annular valve, that is, the face thereof opposed to the composition annulus 23 in the adjacent end of the piston 10 is provided with a raised beading or rib 24 which will bite into the composition insert 23 when the piston 10 is moved a sufficient distance toward the seat 20.

As can be seen in Figure 3, the end of the cylinder liner 9 is formed with slots 25, matching the passageways 18 so as to communicate the passageway through the valve seat 20 with the several passageways 18 between the shell 5 and cylinder 8.

A packing element such as a leather cup 26 is secured by the plate 27 and bolts 28 to the inner end of the piston 10 as shown in Figure 3 and this wipes the inside of the liner 9.

The outer end of the piston 10, which is hollow, has the pocket 29 formed therein for receiving the reduced end portion 30 of the head 13, it being observed in Figure 3 that the bolts 28 extend through the hollow piston 10 and are threadedly driven into the tapered valve head 13. Ports 31 and 32 extend through the inner and outer ends of the piston construction so as to balance the pressure on both sides of the piston 10.

The opposite end of the cylinder 8 from the piston 10 is flanged inwardly as at 33 and has the flanged cap 34 secured thereto by machine screws 35. A sleeve 36 extends inwardly from the cup 34 and encases the adjacent end portion of the screw shaft 12. As can be seen in Figure 3, the inner end of the sleeve 36 is grooved as at 37 to receive the reduced bearing end portion 38 of the shaft 16. A nut is provided on this end portion of the shaft 16 to prevent displacement of the pinion 15. A packing gland 39 is provided on the shell 5 for the shaft 16.

The outer end of the shaft 16 has the hand wheel 40 to permit turning of the shaft, and as is shown in Figure 2, the packing gland 16 has a flanged plunger 41 which is adjustable on the threaded stud 42.

As shown in Figure 3, a port 43 is formed through the sleeve 36 so that pressure can even exert itself in the sleeve 36 against the screw 12 in balancing properly the piston 10.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

A valve apparatus of the character described comprising a shell having an inlet and an outlet, a cylinder in the shell, a valve seat in the inlet, one end of the cylinder being open, a piston slidable in the open end portion of the cylinder and provided with a valve member cooperative with the seat, a threaded stem extending from the piston, a spider in the cylinder having an opening for guiding the stem, a cap at the opposite end of the cylinder provided with a tubular extension projecting inwardly of the cylinder and adapted to receive the free end of the threaded stem, an internally threaded gear interposed between the inner end of the tube and the spider and a drive shaft extending into the shell and provided with a gear meshing with the first mentioned gear, the inner end of the shaft being provided with a reduced extension, said tube being formed with a channel extending inwardly from its free end and receiving the reduced end portion of the shaft.

FRANK J. WILLIAMS.